(12) United States Patent
Guisinger et al.

(10) Patent No.: US 8,357,318 B2
(45) Date of Patent: Jan. 22, 2013

(54) WAX ENCAPSULATION

(75) Inventors: Robert E. Guisinger, Beavercreek, OH (US); Robert B. Wieland, Cincinnati, OH (US)

(73) Assignee: Givaudan S.A., Vernier (CH)

( * ) Notice: Subject to any disclaimer, the term of this patent is extended or adjusted under 35 U.S.C. 154(b) by 912 days.

(21) Appl. No.: 12/109,991

(22) Filed: Apr. 25, 2008

(65) Prior Publication Data

US 2008/0277812 A1    Nov. 13, 2008

Related U.S. Application Data

(60) Provisional application No. 60/928,262, filed on May 8, 2007.

(51) Int. Cl.
*B01J 13/22* (2006.01)
*B01J 13/02* (2006.01)
*A61K 7/06* (2006.01)

(52) U.S. Cl. ............... 264/4.32; 427/213.3; 427/213.31; 428/402.21; 428/402.24; 428/403; 424/401

(58) Field of Classification Search ................. 264/4.32; 424/401
See application file for complete search history.

(56) References Cited

U.S. PATENT DOCUMENTS

| | | | |
|---|---|---|---|
| 3,516,943 A | 6/1970 | Brynko et al. | |
| 4,285,984 A | 8/1981 | Huber | |
| 5,089,269 A | 2/1992 | Noda et al. | |
| 5,759,599 A | 6/1998 | Wampler et al. | |
| 6,039,901 A | 3/2000 | Soper et al. | |
| 6,045,835 A * | 4/2000 | Soper et al. | 426/89 |
| 6,056,949 A | 5/2000 | Menzi et al. | |
| 6,106,875 A | 8/2000 | Soper et al. | |
| 6,123,974 A | 9/2000 | Gautschi et al. | |
| 6,222,062 B1 | 4/2001 | Anderson et al. | |
| 6,231,873 B1 * | 5/2001 | Noda et al. | 424/401 |
| 6,306,818 B1 | 10/2001 | Anderson et al. | |
| 6,325,859 B1 | 12/2001 | De Roos et al. | |
| 6,325,951 B1 | 12/2001 | Soper et al. | |
| 6,335,047 B1 | 1/2002 | Daniher et al. | |
| 6,348,618 B1 | 2/2002 | Anderson et al. | |
| 6,387,431 B1 | 5/2002 | Gautschi | |
| 6,426,108 B1 | 7/2002 | Gautschi | |
| 6,436,461 B1 | 8/2002 | Bouwmeesters et al. | |
| 6,440,912 B2 | 8/2002 | McGee et al. | |
| 6,451,366 B1 | 9/2002 | Daniher et al. | |
| 6,482,433 B1 | 11/2002 | De Roos et al. | |
| 6,610,346 B1 | 8/2003 | Acuna et al. | |
| 6,689,740 B1 | 2/2004 | McGee et al. | |
| 6,805,893 B2 | 10/2004 | Acuna et al. | |
| 6,869,923 B1 | 3/2005 | Cunningham et al. | |
| 6,969,530 B1 * | 11/2005 | Curtis et al. | 424/489 |
| 2001/0008635 A1 | 7/2001 | Quellet et al. | |
| 2002/0081370 A1 | 6/2002 | Daniher et al. | |
| 2003/0082272 A1 | 5/2003 | Bouwmeesters et al. | |
| 2003/0165587 A1 | 9/2003 | Binggeli et al. | |
| 2004/0047960 A1 | 3/2004 | Acuna et al. | |
| 2005/0214337 A1 | 9/2005 | McGee et al. | |
| 2005/0227906 A1 | 10/2005 | Schudel et al. | |
| 2005/0233042 A1 | 10/2005 | Galopin et al. | |
| 2006/0035008 A1 | 2/2006 | Virgallito et al. | |
| 2006/0154850 A1 | 7/2006 | Quellet et al. | |
| 2006/0172917 A1 | 8/2006 | Vedantam et al. | |

FOREIGN PATENT DOCUMENTS

| | | |
|---|---|---|
| DE | 19959806 A1 | 6/2001 |
| EP | 0316054 A1 | 5/1989 |
| WO | WO 01/03825 A | 1/2001 |
| WO | WO 2004/034791 A | 4/2004 |
| WO | WO 2006/056096 A | 6/2006 |
| WO | WO 2007/019719 | 2/2007 |

OTHER PUBLICATIONS

Sarier, Nihal, etal., The Manufacturue of Microencapsulated Phase Change Materials Suitable for the Design of Thermally Enhanced Fabrics, Thermochimica Acta, Aug. 22, 2006, pp. 149-160, vol. 452, No. 2, Elsevier Science Publishers, Amsterdam, NL.
International Search Report for PCT/CH2008/000191.

\* cited by examiner

*Primary Examiner* — James J Seidleck
*Assistant Examiner* — S. Camilla Pourbohloul
(74) *Attorney, Agent, or Firm* — Curatolo Sidoti Co., LPA; Joseph G. Curatolo; Dinah H. Lewitan

(57) ABSTRACT

A process of preparation of microcapsules having a shell and a core that includes a waxy solid, includes
  (a) dispersing particles of waxy solid material in a water-immiscible liquid in which the waxy solid material is insoluble;
  (b) emulsifying the resulting dispersion into an aqueous solution of a capsule wall-forming material to form an emulsion of droplets;
  (c) forming a coating of the capsule wall-forming material on the emulsified droplets containing the dispersed waxy solid particles to provide capsules;
  (d) heating the capsules to a temperature above the melting point of the waxy solid material; and
  (e) cooling the capsules to a temperature below the melting point of the waxy solid material.

11 Claims, No Drawings

WAX ENCAPSULATION

CROSS REFERENCE TO RELATED APPLICATIONS

This application claims the benefit of the filing date, under 35 USC §119(e), from U.S. Provisional Application No. 60/928,262 filed May 8, 2007, which is incorporated by reference as if fully written out below.

TECHNICAL FIELD

This disclosure relates to the encapsulation of waxy solids.

BACKGROUND

It is desired to use waxy solids such as beeswax in microcapsules containing actives such as flavors and fragrances, because the actives partition less readily from a solid than they do from a liquid, leading to advantages such as a more controlled active release and longer shelf life. However, the viscous and tacky nature of these materials makes their encapsulation and practical utilisation difficult.

DESCRIPTION

It has now been found that it is possible not only more effectively to encapsulate waxy solids, but also to increase their effectiveness as flavor and fragrance encapsulants. There is therefore provided a process of preparation of microcapsules comprising a shell and a core that comprises a waxy solid, comprising
  (a) dispersing particles of waxy solid material in a water-immiscible liquid in which the waxy solid material is insoluble;
  (b) emulsifying the resulting dispersion into an aqueous solution of a capsule wall-forming material to form an emulsion of droplets:
  (c) forming a coating of the capsule wall-forming material on the emulsified droplets containing the dispersed waxy solid particles to provide capsules:
  (d) heating the capsules to a temperature above the melting point of the waxy solid material; and
  (e) cooling the capsules to a temperature below the melting point of the waxy solid material.

The waxy solid useful in this process may be any suitable waxy material. "Wax" is used in this context in its normal meaning, a plastic solid material at ambient temperature that softens over a moderately elevated temperature range to give a low viscosity liquid. The end-use of the capsules will often place specific requirements on the wax, but these are evident to the skilled person. For example, if the capsules are to be ingested, for example, as part of a food or a medicine, the wax must naturally be ingestible.

One particular material is beeswax. Others include carnauba wax, rice bran wax, paraffin wax, candellila wax, microcrystalline wax, japan wax, and hydrogenated vegetable oils.

The water-immiscible liquid, which may comprise or include an active ingredient, and in which the waxy solid is insoluble, may be chosen from any such liquid known to the art, subject only to the requirement that it be a liquid at the temperature range at which encapsulation occurs. This is generally at room temperature but it may be advantageous in some circumstances to raise the temperature slightly. Again, the skilled person will know of any special requirements (such as ingestibility) and can provide suitable materials. One suitable liquid is MCT (medium chain triglycerides), a low odour oil derived from vegetable fatty acids and glycerol and widely used as a carrier or flavor compounds in food applications. It is particularly useful, because it is stable to oxidation. Other examples of liquids include mineral and vegetable oils and oil flavors such as limonene.

The capsule-forming material for use in this process may be any capsule-forming material known to the art which is soluble in water, and which can form a shell on the exterior of the wax-liquid emulsion particles. Examples of suitable materials for the formation of capsules include gelatine, gum Arabic, carboxy methyl cellulose (CMC), sodium alginate and pectin.

Encapsulation processes are well known to the art and any suitable encapsulation process may be used in the working of the above-mentioned process. The skilled person will readily recognise the types of processes that are suitable. Examples include coacervation, tri-emulsion, spray drying, interfacial polymerization, in situ polymerization and two-fluid concentric nozzle, e.g., coextrusion.

Coacervation is particularly useful and versatile. It may be induced by any suitable means, for example, pH change, heat or chemical/electrolyte addition.

In a particular embodiment, the capsule-forming material is cross-linkable, that is, it can react to form a three-dimensional network. Such materials are well known to and widely used by the art, and any such material may be used. Specific examples of suitable materials include gelatine-CMC and gelatine-gum Arabic, crosslinked with glutaraldehyde. Crosslinking may be induced after capsule formation (i.e., after step (c) in the process hereinabove described) by any suitable means, for example, heat, radiation or chemical addition.

In the process, the waxy solid is rendered in tiny particles by any convenient means and dispersed in the water-immiscible liquid, which may be a liquid flavor or fragrance, or the solution of such a flavor or fragrance in a suitable solvent that is not soluble in water. This dispersion is then itself dispersed into an aqueous solution of the capsule-forming material and a shell of the capsule-forming material is formed around the dispersed droplets. Should crosslinked shells be desired, crosslinking is induced at this point.

The dispersion is then heated to a temperature above the melting point of the waxy solid. By "melting point" is meant the temperature at which the waxy solid may be considered completely liquid. It is well known in the art that waxy solids have no sharp melting points and that they soften over a temperature range, becoming gradually more fluid, but the skilled person will recognise at what temperature any given waxy solid will become liquid and use this temperature. This temperature is maintained for sufficient time for the waxy solid to melt, typically for at least 15 minutes. The dispersion is then allowed to cool to a temperature below the melting point.

The result is a dispersion of capsules with cores that are a dispersion of waxy solid particles in the water-insoluble liquid. The nature of this post-melt dispersion is different from that of the pre-melt dispersion, because the pre-melt dispersion has particles in the size range of 1-50 microns, whereas the wax in the post-melt dispersion has a crystalline structure and small particle size, typically less than one micron. The nature of this wax dispersion can best be described as "semi-solid", that is, it has the consistency of a relatively fluid wax. As a result of this relatively unitary identity, the capsule core is far better at retaining actives than a liquid core, a feature especially important in some applications such as toothpastes and chewing gum. It has the additional advantage of being much more easily handled than previous attempts to use wax solids in flavor-and fragrance-containing capsules.

As mentioned hereinabove, the active material may be present in, or may be, the water-immiscible liquid. Alternatively, the water-immiscible liquid may be a carrier only and the active material loaded during the process, at the latest at step (d). For this, the capsule walls should be hydrogels. This technique is described in, for example U.S. Pat. Nos. 6,045,835 and 6,106,875, the contents of which are incorporated herein by reference.

The process is now further described with reference to the following non-limiting examples.

EXAMPLE 1

Core/Shell Capsule via Coacervation 32 g of micronized beeswax is added to 128 g of MCT oil in a 250 ml beaker and stirred at high speed to disperse the beeswax. To a 600 ml beaker is added 318 g de-ionized water. While stirring at moderate speed using a 2-inch anchor blade, 10 g piscine gelatin and 1 g carboxy methyl cellulose (CMC) are added and heated to 40° C. to dissolve. The batch is slowly cooled to 34° C. and beeswax/MCT dispersion is added. The dispersion is milled until the desired droplet size is achieved. The batch is slowly cooled to 30° C. and the pH is adjusted to approximately 4.8. The batch is then slowly cooled to 20° C., then rapidly cooled to 10° C. 2.5 ml 50% glutaraldehyde is added and stirred overnight. The batch is then heated to 65° C. and maintained at this temperature for 15 minutes. It is then slowly cooled to ambient conditions.

The batch may then be processed as desired. If capsule slurry is desired, no further steps are necessary. If dried capsules are desired, $SiO_2$ is added as a drying aid. The capsule slurry may be dewatered by means of, for example, centrifugation or vacuum filtering, and the capsules dried using, for example, a fluid bed dryer or tray dried.

EXAMPLE 2

Matrix Capsule via Tri-Emulsion 15 g of finely ground candelilla wax is added to 60 g of soybean oil and mixed at high speed to disperse the wax. To a 1.5 l blender is added 500 g de-ionized water. The wax-oil dispersion is blended into the water at moderate speed and mixed for 5 minutes. 25 g sodium alginate (Keltone™ LV) is then added and mixed for 10 minutes, followed by 25 g microcrystalline cellulose (MCC, Avicel™ PH 101) and a further 5 minutes' mixing, to give a primary emulsion.

The primary emulsion is added to 2 l beaker containing 450 g MCT while stirring at 400 rpm with 4-inch, 4-prong mixer. The stirring rate is increased to 900 rpm and mixing continued for 5 minutes.

This mixture is added to a 4 l beaker containing 800 g of 2% $CaCl_2$ solution while stirring at 500 rpm with 4-inch, 4-prong mixer. The stirring rate is increased to 800 rpm and stirring is continued for 15 minutes. 1000 g of de-ionized water is then added and agitation is stopped. The oil and water layer is decanted and fresh water is added. This procedure is repeated until the bulk of the oil is done. The batch is then heated to 75° C. while stirring and stirring is maintained for 15 minutes. The batch is cooled to ambient temperature and processing is finished by decanting the oil layer, washing multiple times with fresh water, dewatering via centrifugation, and fluid bed drying.

EXAMPLE 3

Encapsulation via Spray-Drying 40 grams of micronized carnauba wax is added to 160 grams flavored oil and mixed to disperse. 800 g maltodextrin, 200 g Capsul™ (a modified food starch derived from waxy maize that is commonly used in spray dry formulations), and 1000 g de-ionized water are mixed in a blender for 5 minutes. The flavored oil/wax dispersion is added to the mixture and mixed for 2 minutes. The resulting emulsion is processed through a spray drier using an outlet air temperature of 85° C. to melt the wax.

Although the process has been described in detail through the above detailed description and the preceding examples, these examples are for the purpose of illustration only and it is understood that variations and modifications can be made by one skilled in the art without departing from the spirit and the scope of the invention. It should be understood that the embodiments described above are not only in the alternative, but can be combined.

We claim:

1. A process of preparation of microcapsules comprising a shell and a core that comprises a waxy solid, comprising
    (a) dispersing particles of waxy solid material in a water-immiscible liquid in which the waxy solid material is insoluble;
    (b) emulsifying the resulting dispersion into an aqueous solution of a capsule wall-forming material to form an emulsion of droplets;
    (c) forming a coating of the capsule wall-forming material on the emulsified droplets containing the dispersed waxy solid particles to provide capsules;
    (d) heating the capsules to a temperature above the melting point of the waxy solid material; and
    (e) cooling the capsules to a temperature below the melting point of the waxy solid material.

2. The process according to claim 1, in which the waxy solid is selected from the group consisting of beeswax, carnauba wax, rice bran wax, paraffin wax, candellila wax, microcrystalline wax, japan wax, hydrogenated vegetable oils, and mixtures thereof.

3. The process according to claim 1, in which the water-immiscible liquid is selected from the group consisting of medium chain triglycerides, mineral oils, vegetable oils, oily flavors, and mixtures thereof.

4. The process according to claim 1, in which the capsule wall-forming materials is selected from the group consisting of gelatine, gum Arabic, carboxy methyl cellulose (CMC), sodium alginate, pectin, and mixtures thereof.

5. The process according to claim 1, in which the capsule wall-forming material is crosslinkable.

6. The process according to claim 5, in which the capsule wall-forming material is selected from the group consisting of gelatine-CMC, gelatine-gum Arabic, and mixtures thereof, crosslinked with glutaraldehyde.

7. The process according to claim 5, further comprising inducing cross linking of the capsule wall-forming material.

8. The process according to claim 1, in which the water-immiscible liquid comprises an active material, a mixture of an active material and a carrier, or a carrier alone.

9. The process according to claim 1, in which the water-immiscible liquid comprises or includes an active material.

10. The process according to claim 1, in which the water-immiscible liquid is a carrier for an active material, the capsule wall is hydrogel and the active material is loaded to the capsule at any stage of the process up to and including stage (d).

11. The process according to claim 1, in which capsule formation takes place by a method selected from the group consisting of coacervation, tri-emulsion, spray drying, interfacial polymerization, in situ polymerization and two-fluid concentric nozzle.

* * * * *